United States Patent [19]
Vranish

[11] Patent Number: 5,967,267
[45] Date of Patent: Oct. 19, 1999

[54] ROLLER UNLOCKING SPRAGS

[75] Inventor: John M. Vranish, Crofton, Md.

[73] Assignee: The United States of America as represented by the Administrator of the National Aeronautics and Space Administration, Washington, D.C.

[21] Appl. No.: 08/600,357

[22] Filed: Feb. 12, 1996

[51] Int. Cl.[6] .............................. F16D 41/07; B60L 5/00
[52] U.S. Cl. ................... 188/82.8; 188/82.84; 192/45.1
[58] Field of Search .................... 192/41 A, 45.1; 188/82.2, 82.3, 82.8, 82.84

[56] References Cited

U.S. PATENT DOCUMENTS

| | | | |
|---|---|---|---|
| 3,119,481 | 1/1964 | Fuchs | 192/45.1 |
| 3,865,219 | 2/1975 | Dossier | 192/45.1 |
| 5,482,144 | 1/1996 | Vranish | 192/45.1 |

*Primary Examiner*—Robert J. Oberleitner
*Assistant Examiner*—Chris Schwartz
*Attorney, Agent, or Firm*—Keith L. Dixon

[57] ABSTRACT

A roller type sprag member consisting of three main elements, an outer roller half section, an inner roller half section, and an assembly-location pin. The sprag locks using roller locking techniques in a manner well known in the case of a three-dimensional (3-D) locking sprag. It unlocks, however, using a roll technique in which the inner and outer roller halves rotate in mutually opposite directions, one clockwise and the other counterclockwise. In the process of rotation, the roller is foreshortened between the distance across the sprag contact surfaces, whereupon it loses its ability to act as a locking sprag and releases.

15 Claims, 6 Drawing Sheets

ROLLER UNLOCKING SPRAGS

CROSS REFERENCE TO RELATED APPLICATIONS

This patent application is related to co-pending U.S. patent application Ser. No. 08/280,979 (GSC13,617), now U.S. Pat. No. 5,482,144 entitled, "3-D Roller Locking Sprags", filed in the name of John M. Vranish, the subject inventor, on Jul. 27, 1994.

The subject patent application is also related to co-pending U.S. patent application Ser. No. 08/598,298 (GSC13,674) entitled, "Screw Released Roller Brake", filed in the name of John M. Vranish, the subject inventor, on Feb. 2, 1996.

These related applications are also assigned to the assignee of the subject invention and, moreover, are intended to be incorporated herein by reference.

ORIGIN OF THE INVENTION

This invention was made by an employee of the United States Government and may be used by or for the Government for governmental purposes without the payment of any royalties thereon or therefor.

BACKGROUND OF THE INVENTION

1. Field of the Invention

This invention relates generally to sprag type locking devices which operate between a drive member and a reaction member and more particularly to a roll-unlocking roller type 3-D sprag device.

2. Description of the Prior Art

Roller type locking brakes including sprag members are well known and have been used extensively for many years because of their unrivaled torque-holding capability while requiring a relatively small package. Also they find favor because they are low power devices and never overheat, because they remain locked with the power off, and because they have extremely long wear life. Such a brake is unique in its ability to release and reengage under full load and does so using rolling friction. Moreover, it excels in applications where safety is paramount, such as overhead cranes, material handling equipment, machine tools and robots.

More recently, the three-dimensional (3-D) roller locking sprag has been developed. Such a structure is shown and disclosed in the above cross-referenced application, U.S. Ser. No. 08/280,979 (GSC13,617), now U.S. Pat. No. 5,482,144. Such apparatus provides an improvement in sprag-type devices which effectively doubles the sprag locking force without increasing the associated contact stresses.

Also, in the above cross-referenced application, U.S. Ser. No. 08/598,298 (GSC13,674), there is shown and described a screw-released roller brake assembly including an input drive assembly, an output drive assembly, a plurality of 3-D locking sprags, a mechanical tripper nut for unlocking the sprags, and a casing therefor. The sprags operate to lock the output drive assembly to the casing so as to prevent rotation thereof in an idle mode of operation. In a drive mode of operation, the tripper is either self-actuated or motor driven so that it is translated linearly up and down against the spline, whereupon at the limit of its travel, the sprags are caused to rotate and unlock while coupling the input drive assembly to the output drive assembly so as to impart a turning motion thereto in either a clockwise or counterclockwise direction.

Sprag and roller and ball locking devices characteristically depend on each rolling member trying to roll over its center and, in the process, creating severe frictional forces as it locks up. The generation of these large frictional forces makes it extremely difficult to free these systems once they are under load. It also means that large radial forces are generated which stress the structure and the rolling members. This stress is relieved by a factor of two or more in the case of 3-D sprags, but is not eliminated. One still cannot disengage and reengage under load using rolling friction. The friction must essentially be overpowered or relieved before the disengagement. If the friction is overpowered, wear will likely result and with it, unwanted particles are produced which can become harmful when located, for example, in a piece of equipment such as a telescope in a spacecraft.

SUMMARY

Accordingly, it is a primary object of the present invention to provide an improvement in roller type braking devices.

It is another object of the present invention to provide an improvement in sprag-type braking devices.

It is a further object of the invention to provide an improvement in three-dimensional sprag type braking devices.

It is still another object of the present invention to provide an improvement in unlocking assemblies using three-dimensional sprag type braking devices.

Briefly, the foregoing and other objects are achieved by a roller type sprag member comprised of three main elements, an outer roller half section, an inner roller half section, and an assembly-location pin. The sprag locks using roller locking techniques in a manner well known in the case of a three-dimensional (3-D) locking sprag. It unlocks, however, using a roll technique in which the inner and outer roller halves rotate in mutually opposite directions, one clockwise and the other counterclockwise. In the process of rotation, the roller is foreshortened between the distance across the sprag contact surfaces, whereupon it loses its ability to act as a locking sprag and releases.

BRIEF DESCRIPTION OF THE DRAWINGS

The following detailed description of the invention will be more readily understood when considered together with the accompanying drawings wherein.

DETAILED DESCRIPTION OF THE PREFERRED EMBODIMENT

Figure 1A:
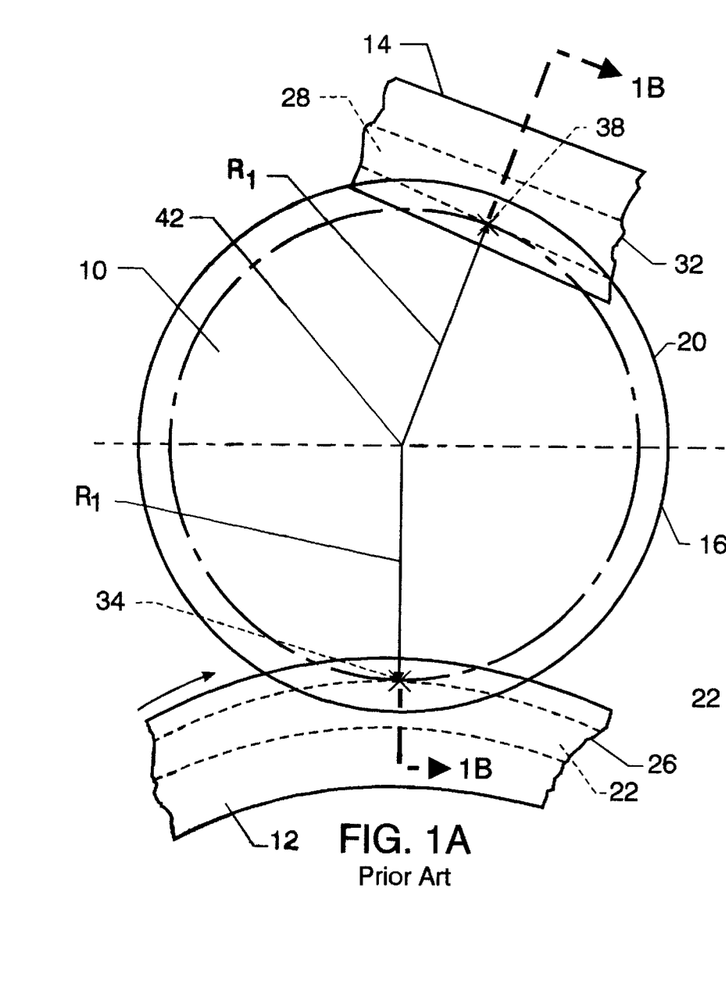
FIGS. 1A and 1B are side elevational view and central cross sectional views, respectively, of a three-dimensional sprag in accordance with the known prior art.
Figure 1B:
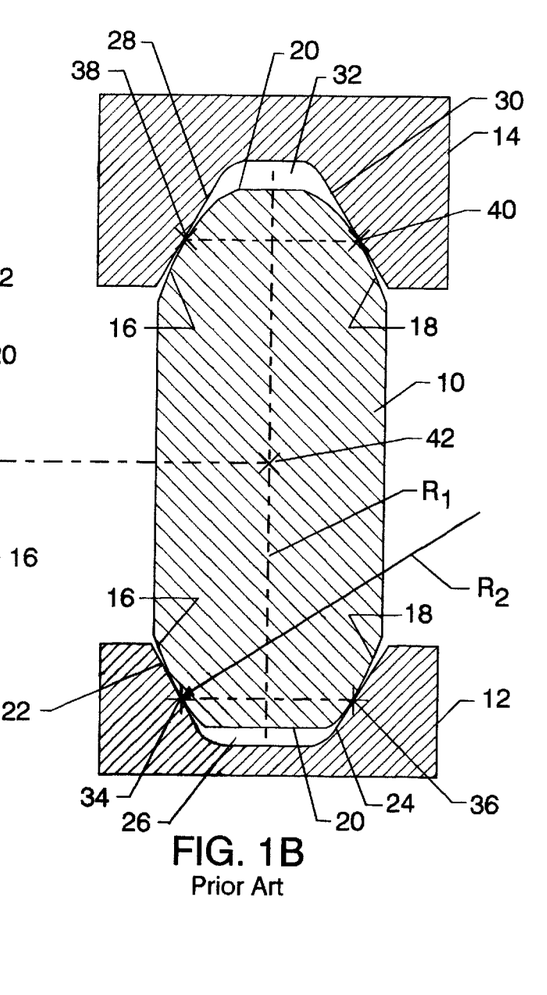

Prior to considering the preferred embodiment of the subject invention, reference will first be made to the prior art where, for example, FIGS. 1A and 1B illustrate the principle of a three-dimensional (3-D) sprag such as shown and described in the above related application U.S. Ser. No. 08/280,979, now U.S. Pat. No. 5,482,144. As shown in FIGS. 1A and 1B, a roller type sprag member 10 is located between a driver member 12 and a reaction member 14. The sprag member 10 includes a pair of symmetrical curved outer side surfaces 16 and 18 inward of a flat peripheral rim surface 20 and which contact a pair of mutually diverging side wall surfaces 22 and 24 of a groove or slot 26 formed in the driver member 12 and a pair of mutually diverging side wall surface 28 and 30 in a groove or slot 32 formed in the reaction member 14. The side wall surfaces 16 and 18 contact the side wall surfaces 22 and 24 of the driver member 12 in the regions identified by reference numerals 34 and 36, while the side surfaces 16 and 18 contact the diverging side wall surfaces 28 and 30 of the reaction member in the regions shown by reference numerals 38 and 40.

Further as shown in FIG. 1B, both pairs of side wall surfaces 22, 24, and 28, 30 of the driver member 12 and the reaction member 14, respectively, are of the same type, i.e. flat surfaces which respectively contact the curved, i.e. convex wall surfaces 16 and 18 of the sprag member 10. It should be noted that the radius of curvature $R_2$ of the surfaces 16 and 18 is relatively large with respect to the radius $R_1$ which extends from the sprag rotational axis 42 outward to the contact surface regions 34, 36 and 38, 40. This permits the sprag member 10 to roll in the grooves 26 and 32 of the driver reaction members 12 and 14 via pairs of symmetrically located opposing contact surfaces.

Such a structure is capable of effectively quadrupling the locking effectiveness of the sprag member 10 against the reaction member 14 without increasing contact stresses on the sprag member 10. It should be noted that various combinations of flat, convex and concave wall surfaces can be utilized, depending upon the specific application.

Figure 2:
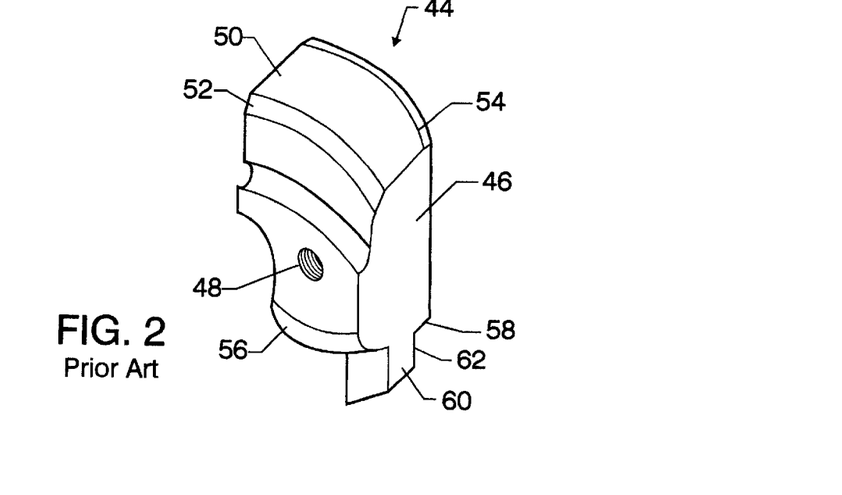
FIG. 2 is a perspective view generally illustrative of a tripper type three-dimensional locking sprag in accordance with the known prior art.

Referring now to FIG. 2, shown thereat is a one-way, 3-D sprag member 44 which is trip actuated and disclosed, for example, in the above cross-referenced application Ser. No. 08/598,298, (GSC13,674). As shown in FIG. 2, the sprag member 44 is comprised of an irregularly shaped body member 46 having a centralized pivot hole 48 for receiving a locating pin, not shown, therethrough. The outer peripheral surface 50 of the body member 46 is flat and from which a pair of chamfered sprag-locking side surfaces 52 and 54 depend. A pair of lower chamfered sprag-locking side surfaces 56 and 58 are formed on the other side of the pivot hole 48 at the lower portion of the sprag body 46. A tail portion 60 of the sprag 44 includes an angulated side face 62 for being actuated by a tripper mechanism, not shown. In use, when a tripper strikes the angulated side face 62, the sprag member 44 will rotate, causing an unlocking action against a reaction member, not shown, in a manner well known to those skilled in the art.

Figure 3A:
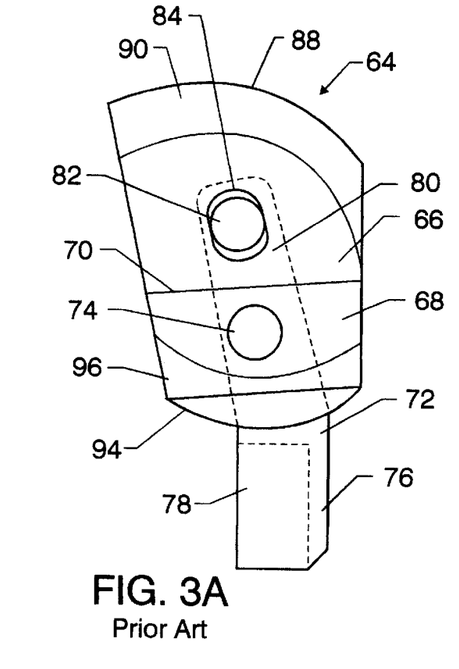
FIGS. 3A and 3B are side elevational and front elevational views, respectively, of a split type three-dimensional sprag in accordance with the known prior art.
Figure 3B:
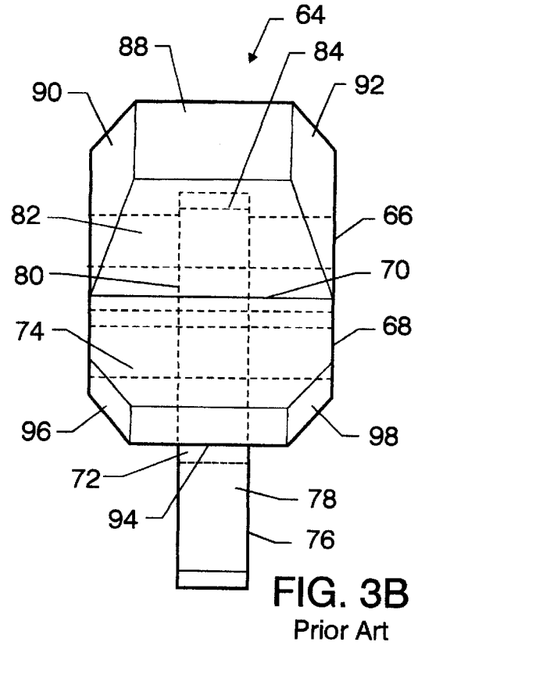

In an effort to improve the operation of the sprag-type locking mechanism shown in FIG. 2, a sprag configuration as shown in FIGS. 3A and 3B has recently been developed. There a sprag member 64 is shown comprising two contiguous upper and lower body members 66 and 68 which contact one another along a common surface 70. The bottom half portion 68 of the sprag member 64 is pinned to a tail member 72 by a first pin 74. The tail member includes a lower portion 76 which includes an angulated tripping face 78. The upper portion 80 of the tail member 72 includes a second pin 82 which is adapted to engage an oblong hole 84 in the upper half section 66.

In such an arrangement, the upper and lower sections 66 and 68 can separate and release under load. As before, the upper half section 66 of the sprag member 64 includes a flat peripheral outer surface 88 from which a pair of chamfered sprag contact side surfaces 90 and 92 depend. The lower section 68 of the sprag 64 includes a flat peripheral perimeter surface 94 from which depend two chamfered sprag contact surfaces 96 and 98.

Considering now the preferred embodiment of the subject invention, it comprises an evolution of the 3-D sprag concept which has been shown and described above with respect to FIGS. 1–3. The preferred embodiment comprises a sprag member 100, the details of which are shown in FIGS. 4–7.

Figure 4:
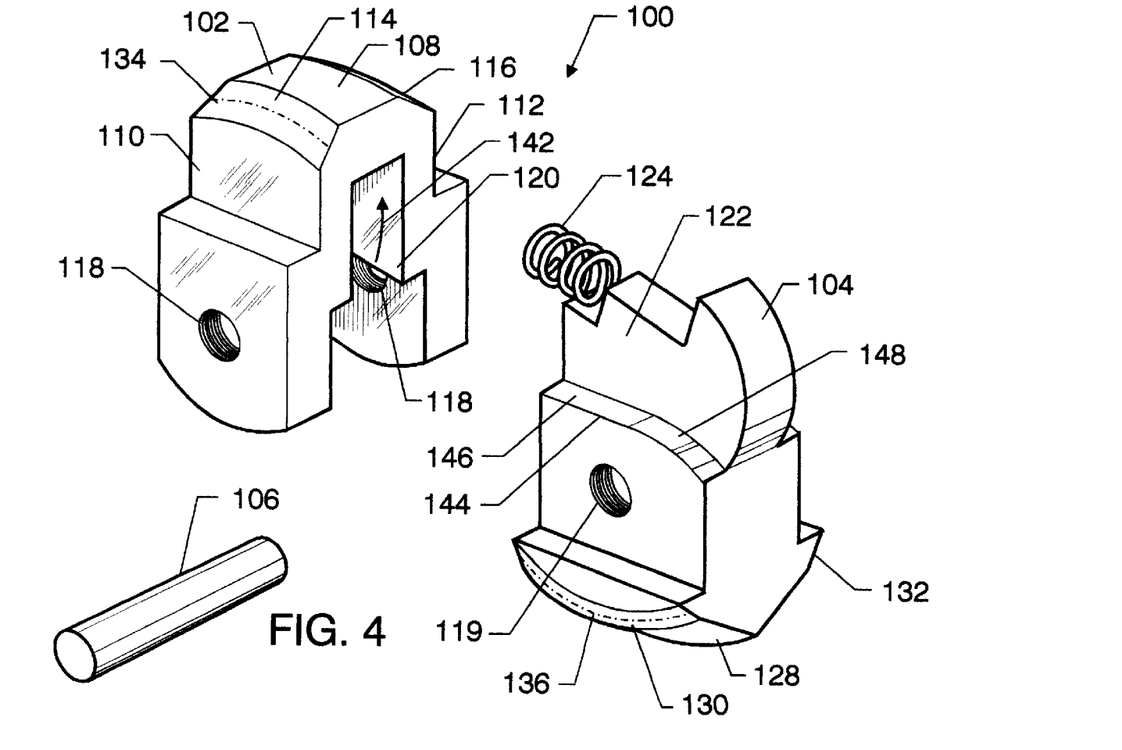
FIG. 4 is an exploded perspective view illustrative of the preferred embodiment of the subject invention.
Figure 5:
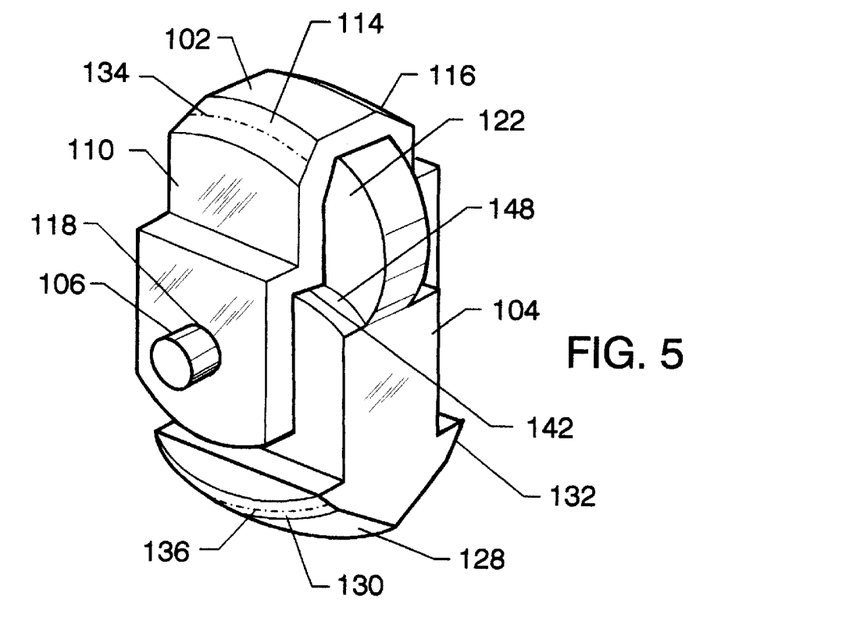
FIG. 5 is a perspective view further illustrative of the preferred embodiment of the subject invention.

As shown in FIGS. 4 and 5, the sprag member 100 is comprised of three main components, an inner roller half section 102, an outer roller half section 104 which partially fits inside the upper section 102 and an assembly/location pin 106. The inner half section 102 includes a flat peripheral surface 108 and two flat side wall surfaces 110 and 112 between which is located a pair of convex sprag contact surfaces 114 and 116. The pin 106 passes through bores 118 in the inner section 102 and a bore 119 in the outer section 104.

The inner half section 102 includes a hollow central interior portion 120 which is adapted to receive a complementary solid portion 122 of the outer half section 104. A notch 123 (FIG. 6A) is formed in the outer part of the interior portion 120 for holding a preload spring 124 against a shoulder 126 of the solid portion 122. The outer half section 104 also includes a flat peripheral outer surface 128 and a pair of convex sprag contact side surfaces 130 and 132. In FIGS. 4 and 5, reference numerals 134 and 136 denote respective lines of sprag contact points on the surfaces 114 and 130. Corresponding sprag contact points 138 and 140 are located on the other side of the device 100 as shown, for example, in FIG. 6B.

As best shown in FIGS. 6A, 6B, and 7A, 7B, the half sections 102 and 104 contact one another along opposing inclined surfaces 142 and 144 which include three separate centers of rotation, i.e. a center C for rotation for the sprag 100 as a whole, a center $C_O$ for rotation of the outer roller half section 104 and which lies to the right of the center C, and a center $C_i$ for the inner half roller section 102 and which lies to the left of the center C. It should be noted that the surface 142 of the inner half section 102 comprises a single continuous linear surface as shown while the surface 144 of the outer half section 104 is comprised of a linear surface segment 146 to the left of the center $C_o$ and a curved surface segment 148 to the right of the center $C_o$.

Figure 7A:
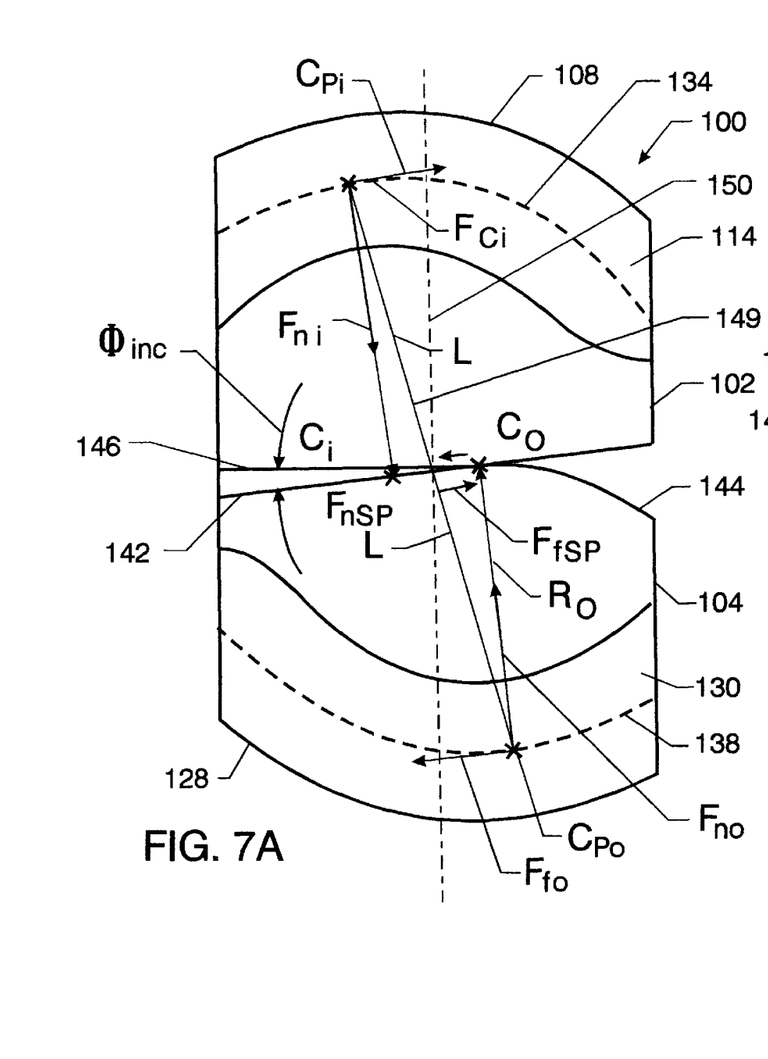
FIGS. 7A and 7B are diagrams helpful in understanding the operation of the subject invention.

Roll locking and unlocking of the sprag 100 operates on its ability to foreshorten the length L of a line 149 extending between the sprag contact points $C_{pi}$ and $C_{po}$ on lines 134 and 138 and passing through the center C. This results from the contacting surfaces 142 and 146 to the left of the center $C_o$ being inclined at a slant angle $\phi_{inc}$ relative to a normal to a radial line 150 from the center C. FIG. 7A depicts the sprag 100 in a locked condition while FIG. 7B illustrates the unlocked condition.

Figure 7B:
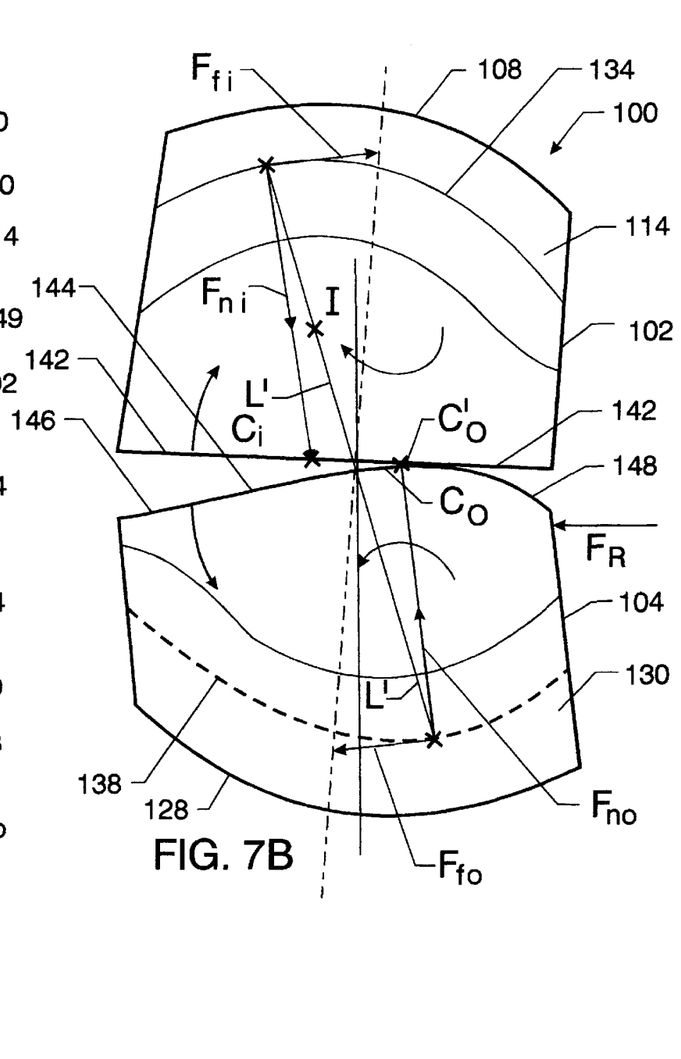

During unlocking, for example, when an external force $F_R$ is applied to the outer half section 104 as shown in FIG. 7B, the two half sections 102 and 104 rock or rotate in mutually opposite directions about the center $C_o$. The sprag 100 locks when the two halves 102 and 104 rotate back to the position shown in FIG. 7A. The curved surface segment 148 of surface 144 permits unlocking of the sprag 100.

It can be shown that the sprag 100 will be stable if: (1) the roll release point is located at the center $C_o$ where the curved surface segment 148 begins; (2) the contact force $F_{no}$ normal to the outer sprag section 104 at its contact point $C_{po}$ on line 138 passes very close, through or to the left of $C_o$; (3) the contact force $F_{ni}$ normal to the inner sprag section 102 at its contact point $C_{pi}$ on line 134 passes very close or through or to the right of $C_i$; and (4) $C_i$, C and $C_o$ are precisely located.

Figure 6A:
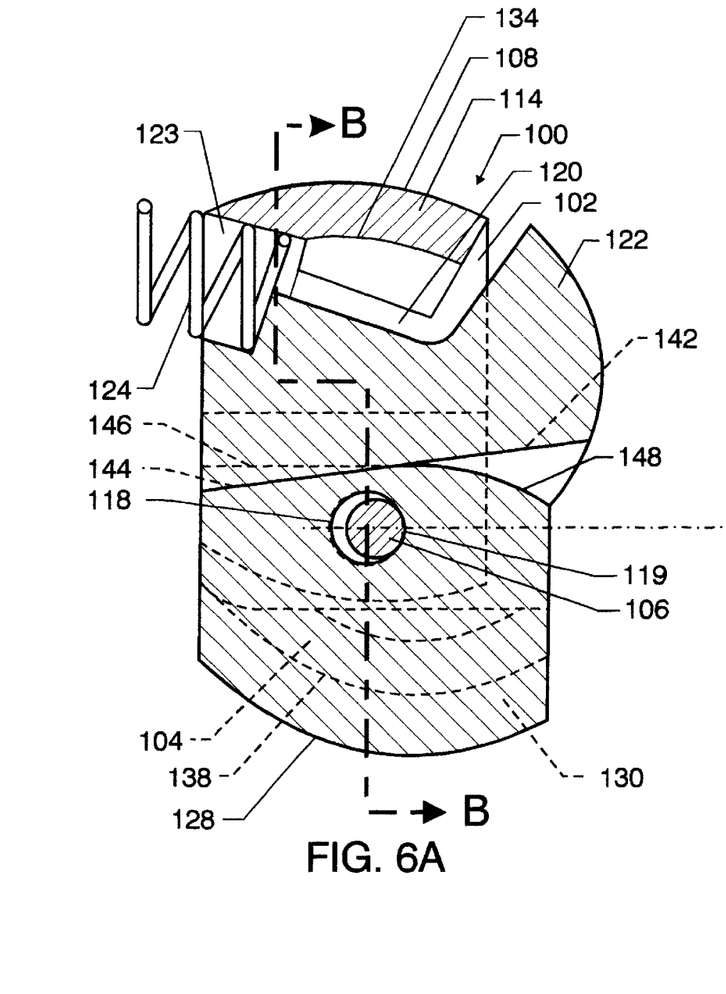
FIG. 6A is a sectional view of the sprag member shown in FIGS. 4 and 5 taken along the lines A—A of FIG. 6B.
Figure 6B:
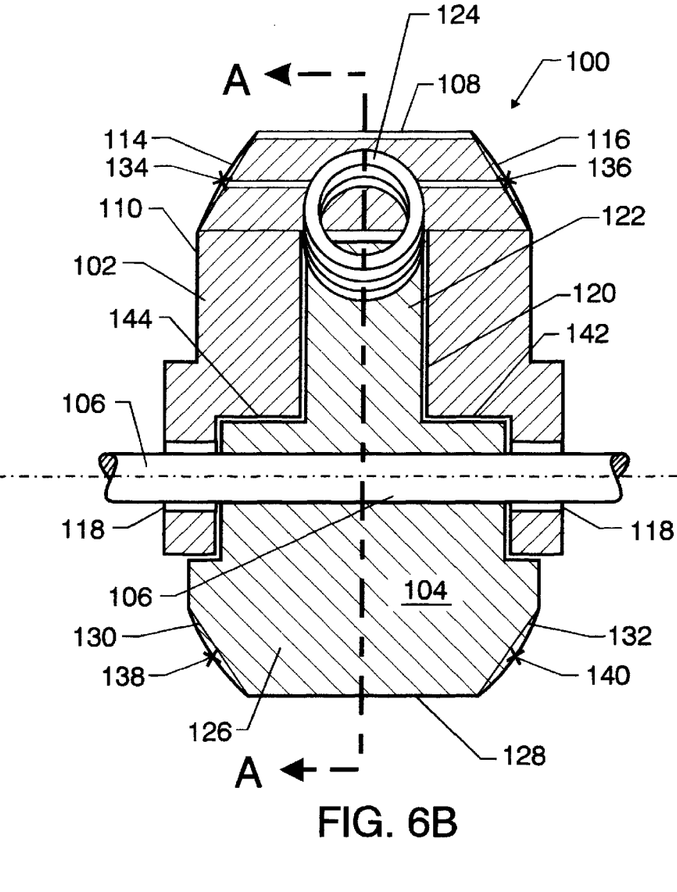
FIG. 6B is a sectional view of the sprag shown in FIG. 4 taken along the lines B–B of FIG. 6A.

The precise locations of $C_i$, C and $C_o$ are provided by the locating pin 106 having a relatively smaller diameter than the bores 118 in the inner half sprag section 102 so that a loose fit is provided and fabricated such that there is a deliberate clearance between the pin 106 and the wall of the bores 118 such that the right-most point of the holes 119 (FIG. 6A) matches up with the right-most point of the pin 106 as shown in FIG. 6A.

Such an arrangement of the interfacing surfaces 142 and 146 perform three functions, i.e. they align the sprag halves 102 and 104, they resist the forces $F_{nsp}$ and $F_{fsp}$ produced at the interface of surfaces 142 and 146 and provide a wear surface during unlocking that is relatively larger in area with low contact stresses and thus very little wear.

Locking of the sprag 100 is initiated by the preload spring 124 shown in FIG. 4 acting on the outer sprag half section 104, with the outer sprag half section 104 contacting the inner sprag half section 104 and the two sections moving together to initiate locking. This contact takes place through contact between the pin 106 and the enlarged bore 118 in the inner sprag half section 102 shown in FIGS. 6A and 6B, so that the two halves are precisely positioned with respect to each other at the instance of locking.

The deliberate clearance provided between the bore 118 and the pin 106 is such that during the build up of torque during locking under large loads, the inner and outer sprag half sections 102 and 104 move together, staying precisely located with respect to each other and acting as a single sprag; however, during unlocking, the pin 106 moves away from the contact with the edge of the bore 118 into the clearance region so that it is facilitated in rolling free during unlocking without interference from the pin 106.

Figure 8:
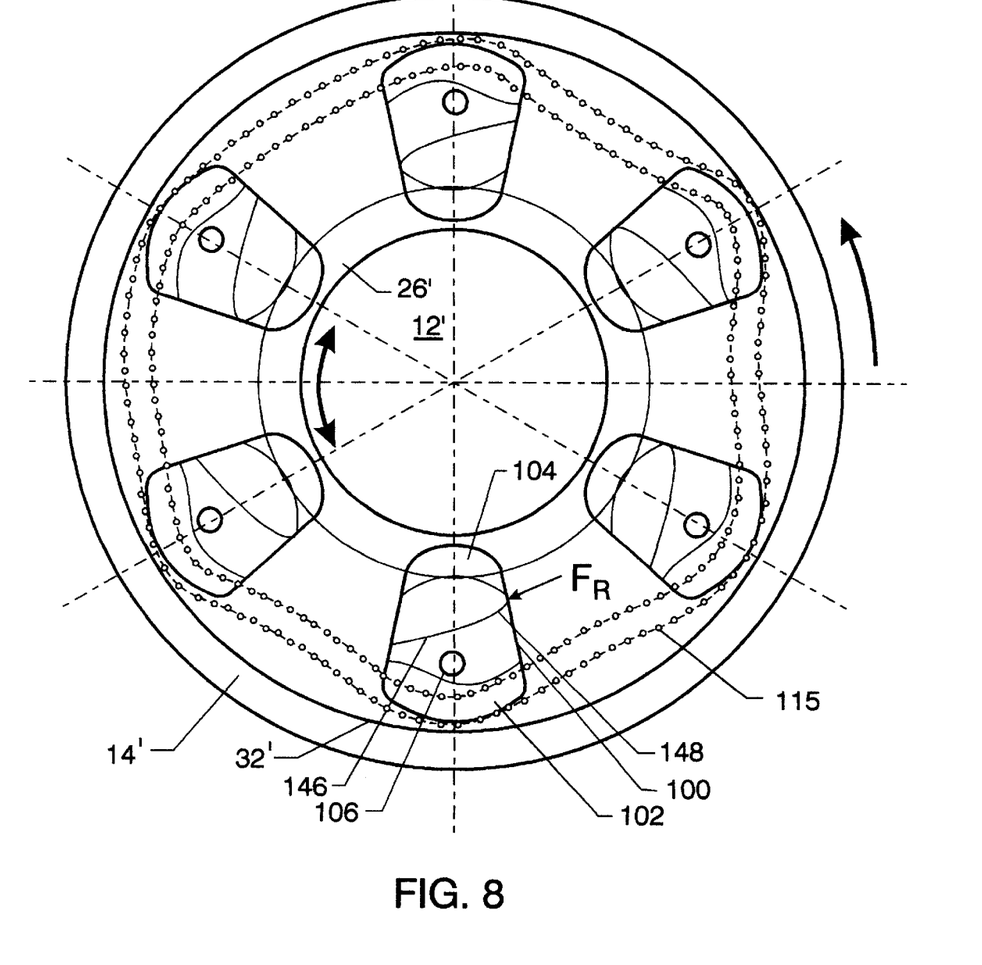
FIG. 8 is a front elevational view of a clutch mechanism utilizing a set of sprags in accordance with the subject invention.

An application of the subject invention is shown in FIG. 8 wherein a plurality of sprags 100 are located in a one-way clutch mechanism comprised of an inner drive member 12' and an outer reaction member 14'. The outer half sprag sections 104 reside in a groove or slot 26' of the drive member 12', while the inner sprag half sections 102 reside in a groove or slot 32' of the reaction member 14 in a manner analogous to the arrangement shown in FIGS. 1A and 1B. As shown by the embodiment in FIG. 7, a single preload spring 115 is interleaved through all of the sprags 100 and acts to provide a moment on the outer sprag halves 104 to lock up the sprag member 100. A clockwise rotation of the drive member 12', however, will impart an unlocking force $F_R$ to the outer sprag half sections 104, causing the clutch to release. Nevertheless, a rotation of the drive member 12' will cause the sprag 100 to lock and produce a counterclockwise rotation of the reaction member 14'.

Other applications are possible as suggested in the embodiments shown and described in the related copending U.S. patent application Ser. No. 08/598,298, (GSC13,674).

Having thus shown and described what is at present considered to be the preferred embodiments of the invention, it should be noted that the same has been made by way of illustration and not limitation. Accordingly, all modifications, alterations and changes coming within the spirit and scope of the invention as set forth in the appended claims are herein meant to be included.

I claim:

1. A sprag device which operates to couple a rotatable drive member to a rotatable reaction member when locked together and to uncouple said members when unlocked, said sprag comprising:

first and second roller sprag sections;

said first and second sprag sections being rotatable in mutually opposite directions and having interfitting body portions including opposing body portion contact surfaces, said body portions being interconnected by a transverse locating pin passing through mutually adjacent flat side wall surfaces of said body portions;

said body portion contact surfaces being further inclined relative to an axis perpendicular to a central longitudinal axis passing through said first and second sprag sections;

one of said contact surfaces being comprised of a single linear contact surface and the other of said contact surfaces being comprised of a linear surface segment abutting said single linear contact surface of and a curved surface segment diverging away from said single linear contact surface.

2. A sprag device in accordance with claim 1 wherein said body portions of said first and second sprag sections each include a flat peripheral outer surface and two mutually separated sprag contact surfaces extending outwardly therefrom to said side wall surfaces.

3. A sprag device in accordance with claim 2 wherein said sprag contact surfaces comprise convex contact surfaces.

4. A sprag device in accordance with claim 3 wherein said first sprag section comprises an outer sprag section for contacting said drive member and said second sprag section comprises an inner sprag section for contacting said reaction member, and wherein three separate centers of rotation are located along said inclined abutting contact surfaces, a first center of rotation for the sprag as a whole, a second center to one side of said first center for rotation of said outer sprag member and a third center to the other side of said first center for rotation of said inner sprag member.

5. A sprag device in accordance with claim 4 wherein said side wall surfaces include bores for the passage of said assembly pin therethrough.

6. A sprag device in accordance with claim 5 wherein the bores in the flat wall sections of an inner body portion of said interfitting body portions comprise enlarged bores for self aligning the sprag sections along said centers.

7. A sprag device in accordance with claim 6 wherein said second center of rotation is located in a transition region where said linear surface segment of said outer sprag member meets said curved surface segment.

8. A sprag device in accordance with claim 7 wherein said sprag sections have respective sprag contact points on said sprag contact surfaces on opposite sides of said first center of rotation and wherein the length of a line passing through said first center of rotation and extending between said sprag contact points becomes shortened to unlock the sprag device when said sprag sections rotate about said second center of rotation causing a space to appear between said single linear contact surface and said linear surface segment.

9. A sprag device in accordance with claim 8 wherein said sprag contact point of said outer sprag section is located relative to said second center of rotation whereby a contact force normal to the outer sprag section passes in relatively close proximity to said second center of rotation in a locked mode of operation.

10. A sprag device in accordance with claim 8 wherein said sprag contact point of said inner sprag section is located relative to said third center of rotation whereby a contact force normal to the inner sprag section passes in relatively close proximity to said third center of rotation in a locked mode of operation.

11. A sprag device in accordance with claim 8 wherein said sprag contact points of said outer and inner sprag sections are located relative to respective said second and third centers of rotation whereby respective contact forces normal to the outer and inner sprag sections pass substantially through said second and third centers of rotation.

12. A sprag in accordance with claim 4 where the body member of said inner sprag member comprises a bifurcated body member.

13. A sprag device in accordance with claim 1 and additionally including means for biasing said first and second roller sprag sections into a locked relationship and becoming unlocked upon an external force being applied to said outer sprag section and causing said outer sprag section to rotate about said second center.

14. A sprag in accordance with claim 13 wherein said means for biasing comprises a preload spring.

15. A sprag in accordance with claim 14 wherein said preload spring applies a bias force to said inner sprag member.

* * * * *